Feb. 4, 1964  S. R. FARRELL  3,120,609
ENLARGEMENT OF CHARGED PARTICLE BEAMS
Filed May 4, 1961  4 Sheets-Sheet 1
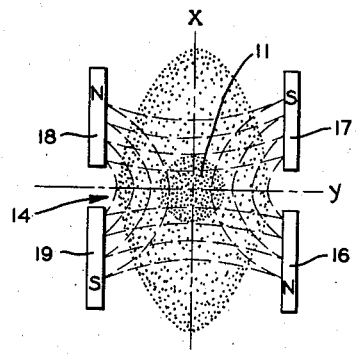
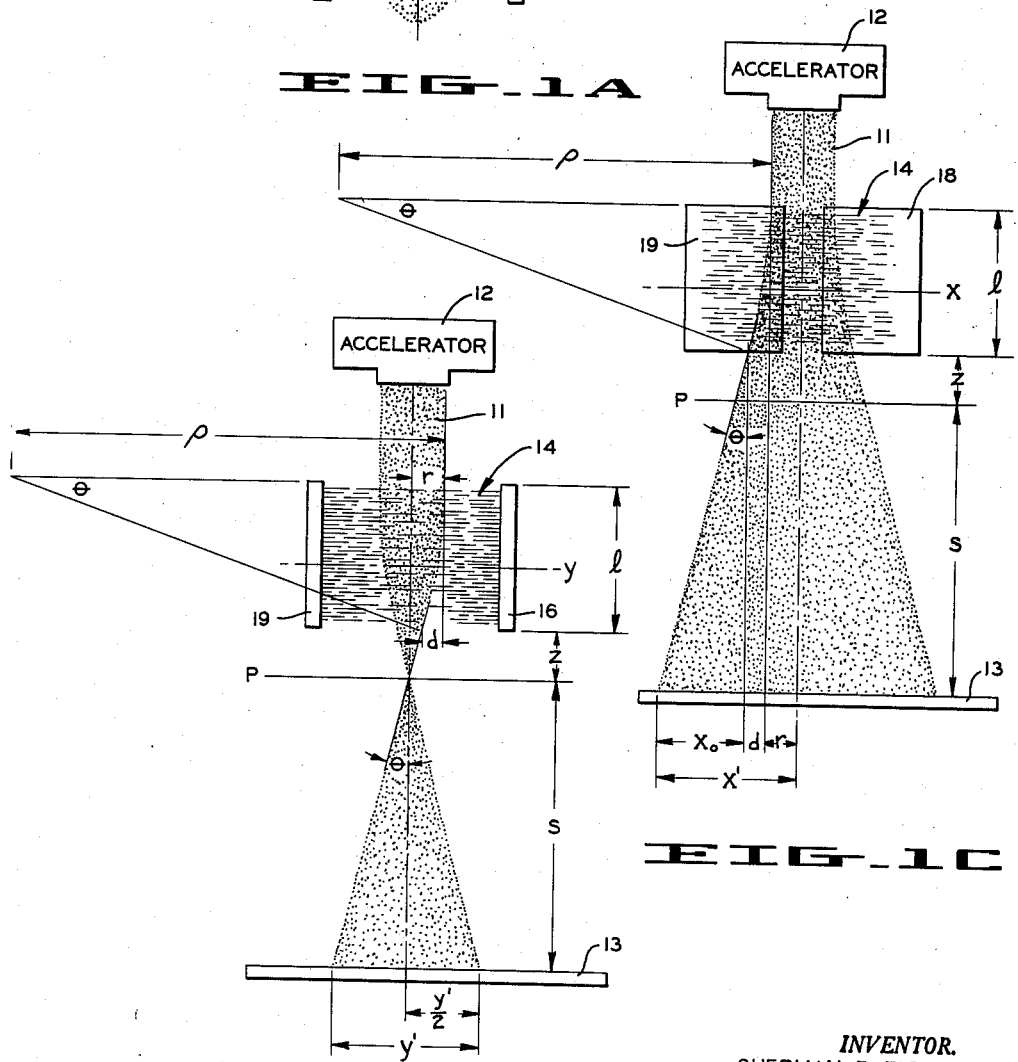
INVENTOR.
SHERMAN R. FARRELL
BY Schapp & Hatch
ATTORNEYS

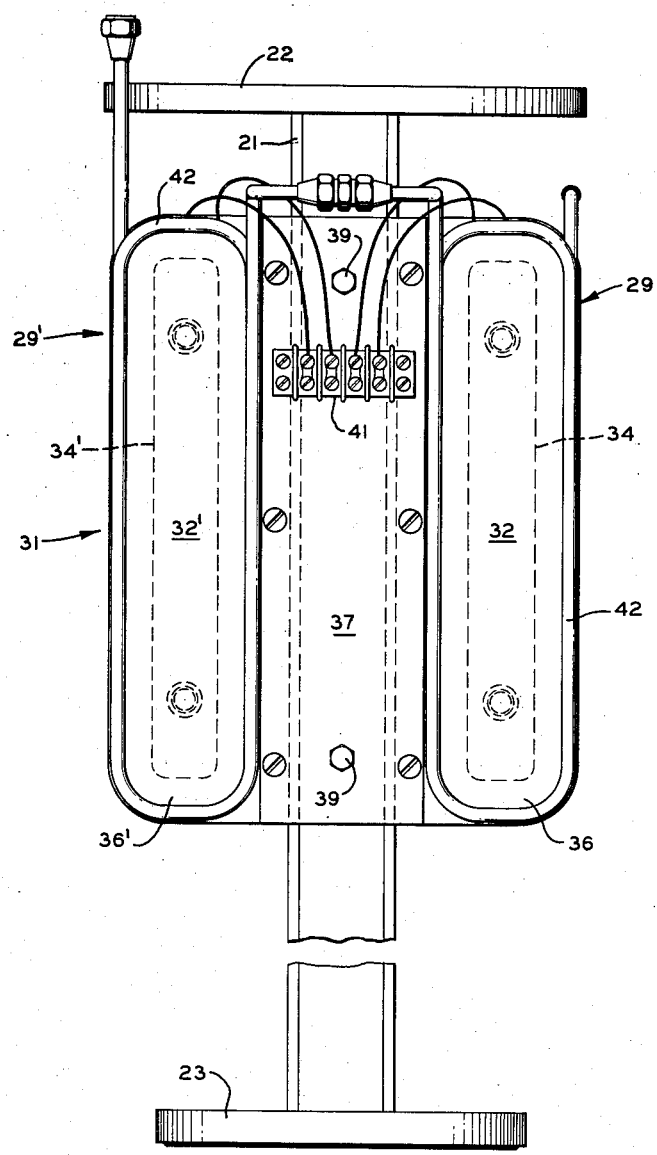

Feb. 4, 1964
S. R. FARRELL
3,120,609
ENLARGEMENT OF CHARGED PARTICLE BEAMS
Filed May 4, 1961
4 Sheets-Sheet 3
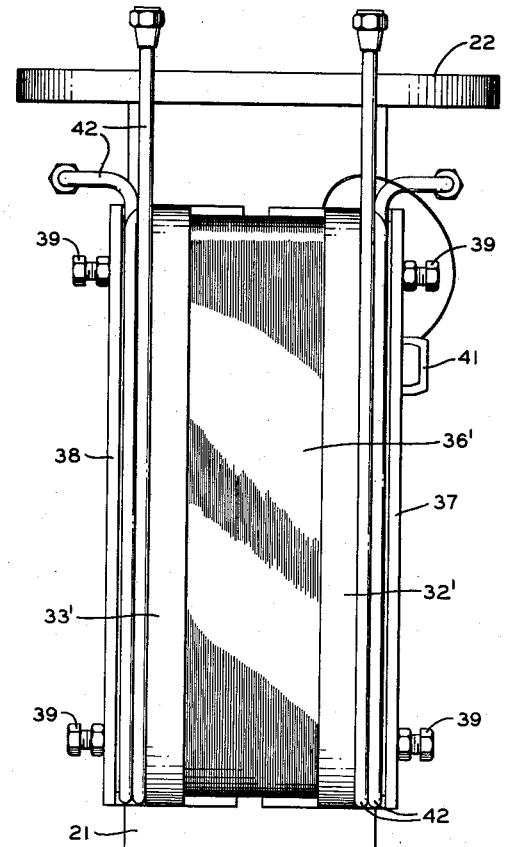
FIG_3_
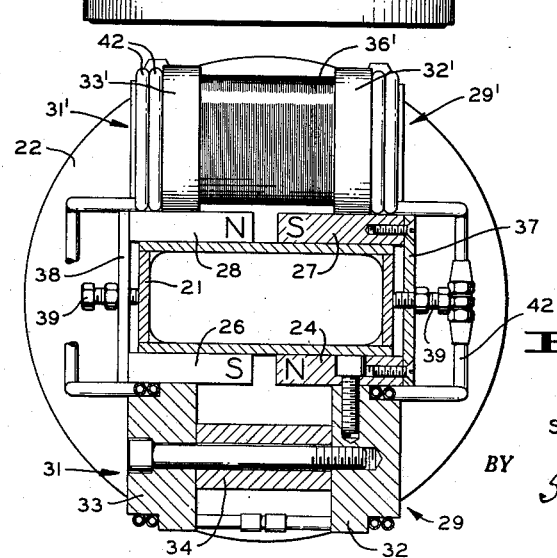
FIG_4_
INVENTOR.
SHERMAN R. FARRELL
BY *Schapp & Hatch*
ATTORNEYS

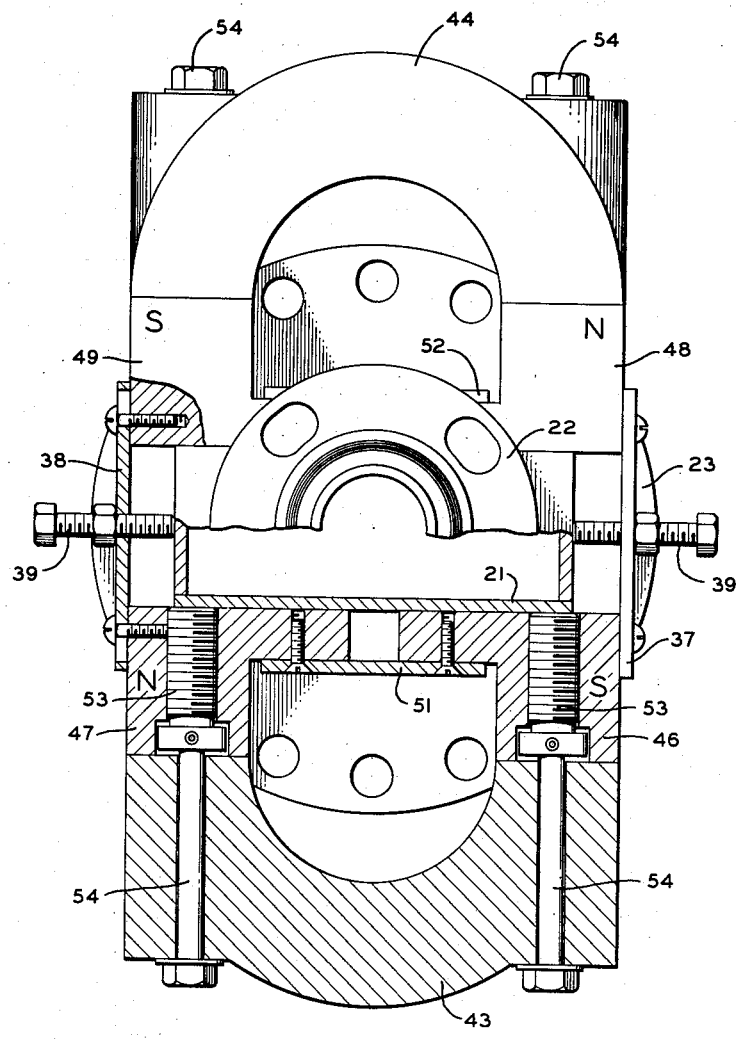
FIG_5_

United States Patent Office 3,120,609
Patented Feb. 4, 1964

3,120,609
ENLARGEMENT OF CHARGED PARTICLE BEAMS
Sherman R. Farrell, Orinda, Calif., assignor, by mesne assignments, to High Voltage Engineering Corporation, Burlington, Mass., a corporation of Massachusetts
Filed May 4, 1961, Ser. No. 107,834
5 Claims. (Cl. 250—49.5)

This invention relates to improvements in enlargement of charged particle beams, and is more particularly directed to a method and means for elongating the cross section of a beam along two mutually perpendicular axes.

Various methods and means have been devised to distribute the intensity of a charged particle beam over a relatively large surface area greater than the normal cross sectional area of the beam. One device for this purpose is disclosed in my prior Patent #2,896,103, issued July 21, 1959, and entitled charged particle beam diffuser.

In this device, as well as in other devices for an analogous purpose, an appropriately shaped magnetic field is generated transversely across the axis of beam transit, with the strength of the field progressively decreasing in directions away from the beam axis along an axis normal thereto. The individual particles of the beam in passing through the field are deflected outward from the beam axis along the axis of field variation by amounts dependent upon their positions in the beam cross section. The net effect of the deflection field is to elongate the beam along the axis of field variation whereby a beam of enlarged cross sectional area is obtained.

Although previous beam enlarging methods and means have proved effective in enlarging a beam in the foregoing manner, it is particularly important to note that the enlargement of the beam occurs along a single axis. Hence, the resulting area of a work piece or the like irradiated by the enlarged beam is relatively narrow. Where an irradiated area of greater width more nearly approaching a square cross section is required it is necessary to effect relative movement of the work piece and the beam along an axis at right angles to that of beam elongation. It would of course be desirable, in many instances, for the irradiated area at the work piece to be initially of the desired comparable lengthwise and widthwise dimensions so as to eliminate any requirement of relative movement between the work piece and beam.

It is therefore an object of the present invention to provide a method and means for the quadrilateral enlargement of a charged particle beam by deflection of the particles in a hyperbolic field.

Still another object of the invention is the provision of a quadrilateral beam enlarger with which the length and width of the resultant enlarged beam cross section at a work piece may be readily adjusted.

A further object of the invention is the provision of a beam enlarger of the class described that is simple, compact, and relatively economical in construction.

Further objects and advantages of my invention will be apparent as the specification progresses, and the new and useful features of my enlargement of charged particle beams will be fully defined in the claims attached hereto.

The preferred forms of my invention are illustrated in the accompanying drawings forming part of this application, in which:

FIGURES 1a, 1b and 1c are schematic illustrations depicting quadrilateral enlargement of beam cross section in accordance with the method of the present invention, portion 1A being a plan view and portions 1B and 1C being elevational views respectively parallel to the $x$ and $y$ transverse axes of the beam;

FIGURE 2 is a side elevational view of a preferred embodiment of a beam enlarger constructed in accordance with the present invention;

FIGURE 3 is an end elevation of the beam enlarger of FIGURE 2;

FIGURE 4 is a plan view of the beam enlarger of FIGURES 2 and 3 with portions broken away and shown in section to reveal internal construction;

FIGURE 5 is a plan view with portions broken away, of a modified form of the beam enlarger.

While I have shown only the preferred forms of my invention, it should be understood that various changes or modifications may be made within the scope of the claims attached hereto without departing from the spirit of the invention.

Referring to the drawings, FIGURES 1a and 1b depict a charged particle beam 11 directed from a particle accelerator 12, or equivalent source of high energy particles, upon a work piece 13 to be treated by irradiation. So that a comparatively large area of the work piece 13 will be covered, the beam 11 is directed through a magnetic field 14 prior to impingement upon the work. This field is operable to enlarge the beam cross section through magnetically deflecting the individual particles of the beam by varied amounts that depend upon the lateral position of the particular particle relative to the beam axis.

It will be appreciated that the beam enlarging method thus far generally described is similar to beam enlarging methods employed heretofore. Previously, however, the magnetic deflection fields have been of such a configuration and employed in such a manner that enlargement of the beam has occurred along a single transverse axis, for example the $x$-axis depicted in FIGURE 1c. Accordingly, the resulting beam pattern at the work piece has been a relatively narrow elongated strip, and where a relatively wide dosage area more nearly approaching a square is required it has been necessary to provide relative translation between the beam and work piece in a direction widthwise of the strip.

In order to obviate any requirement of relative movement between the beam and the work piece, the method of the present invention provides for quadrilateral enlargement of the beam cross section, that is, transverse enlargement along a $y$-axis as well as an $x$-axis.

In accordance with the present method, and as shown in FIGURE 1a, the magnetic field 14 is of substantially hyperbolic (quasi-hyperbolic) configuration with $x$ and $y$ axes of symmetry. The strength of the field progressively increases along the $x$-axis and along the $y$-axis outwardly from the beam axis. Furthermore, the field portions on opposite sides of the beam axis are of opposite polarity, so that the field portion that increases in strength in the $+x$ direction opposes the one that increases in strength in the $-x$, and the $+y$ increasing field portion opposes the $-y$ increasing field portion.

The entire field 14 is disposed in space to extend over a distance, $l$ of the beam axis. A variety of means may be employed to generate such a hyperbolic field configuration, as for example four magnetic pole pieces 16, 17, 18, 19 of length, $l$, disposed with alternate north and south polarity at the corners of a rectangular section transversely centered with the beam axis.

With a hyperbolic field 14 provided in the manner described, the particles of the beam will tend to be defocussed along one axis, e.g., the $x$-axis, and focussed along the other axis, e.g., the $y$-axis. Hence at a plane, P, displaced a distance, $z$, from the lower end of the field, the beam appears elongated along the $x$-axis and narrowed along the $y$-axis.

This configuration of beam cross section is, of course, at variance with the desired results of the method. It is particularly important to note, however, that the beam particles in converging in the $y$ direction cross over at the plane P (note FIG. 1(a)) to thereafter diverge or be defocussed along the $y$-axis at positions displaced from the cross-over plane in the direction of beam transit. The beam particles, moreover, continue to be defocussed along the $x$-axis subsequent to passing through the cross-over plane. Accordingly, by locating the work piece 13 at a position that is displaced from the cross-over plane, P, by a distance, $s$, the beam cross-section at impingement of the work piece is expanded along both the $x$ and $y$ transverse axes.

The resulting irradiated area of the work piece is relatively wide as well as long and the specific dimensions of such area may be varied to provide a wide range of sizes of irradiated areas at the work piece simply by varying the distance, $s+z$, between the field and work piece. Control over the size and configuration of the irradiated area may also be effected by adjusting other parameters, such as by varying the strength of the field which in turn changes the position of the cross-over plane relative to the work piece and hence the amount of deflection imparted to the beam particles.

Considering now more specifically the manner in which irradiated areas of varied dimensions may be obtained at the work piece 13, the pertinent relationships between beam energy, field strength, distance between field and work piece, etc., and dimensions $x'$ and $y'$ of the irradiated area are hereinafter derived. Considering the beam 11 to be composed of electrons having an energy of E volts and a radius of $r$ cm., an electron traveling at the outer periphery of the beam and on the $y$-axis, and which encounters a field strength of H gauss at the radius, $r$, will be deflected along a radius of curvature, $\rho$, in passing through the field, $\rho$ being given to close approximation by:

$$\rho = \frac{E}{300H}$$

The displacement, $d$, of the electron from its initial position in passing through the field of length, $l$, is then given by:

$$d \approx \frac{l^2}{2\rho}$$

Also, the angle, $\theta$, with which the electron leaves the field can be derived from:

$$\sin \theta = \frac{l}{\rho}$$

This angle can be utilized to calculate the distance, $z$, of the cross-over plane P from the field, the pertinent relationship being:

$$\tan \theta = \frac{r-d}{z}$$

such that $$z = \frac{r-d}{\tan \theta}$$

For any desired widthwise dimension, $y'$, of the irradiated area at the work piece, the corresponding distance, $s$, from the cross-over plane is similarly given by:

$$\tan \theta = \frac{y'}{2s}$$

or $$s = \frac{y'}{2 \tan \theta}$$

Thus, from the expressions for $z$ and $s$, the necessary distance of the work piece from the field, viz., $z+s$, to produce a widthwise dimension of $y'$ can be readily determined for a given set of beam and field parameters. Likewise, the foregoing expressions can be utilized to calculate the variation in the dimension, $y'$, effected by variation of the field strength, H, with a fixed distance, $z+s$, between the work piece and field.

With regard to the variation in the dimension $x'$ effected by variation of the various distance and field parameters, it will be appreciated that the foregoing relations also hold for the defocussed electrons that diverge along the $x$-axis in passing through the field, except that the angle $\theta$ is in this instance the diffusion angle of the ray. Accordingly, for an electron at the outer periphery of the beam and on the $x$-axis (see FIG. 1(c) which encounters a field strength, H, the displacement, $x_0$, of the electron at the work piece from its final position in the field displaced the distance from its initial position is given by:

$$x_0 = (s+z) \tan \theta$$

Hence the overall displacement $$\frac{x'}{2}$$

from the beam center line is:

$$\frac{x'}{2} = r + d + (s+z) \tan \theta$$

Thus the distance between the work piece and deflection field, the strength of the field, or both, may be adjusted in accordance with the foregoing equations to provide whatever $x$ or $y$ dimensions of irradiated area is desired, the other dimension being then determined by the parameters selected. The field may of course be appropriately shaped so that the field portions on one axis will be of greater strength than those on the other axis and the defocussing effect will be less than the focussing effect of the field. With appropriate adjustment in this regard both the $x$ and $y$ dimensions can be made equal so that a square area of irradiation is obtained.

As a specific example of the application of the relationships set forth hereinbefore in describing the method of the present invention, consider the case where it is desired to obtain, from a 10 mev., 1 cm. radius electron beam, an irradiated area of the work piece 13 having a width of 4 cm. and a length at least as large as the width. Also consider the hyperbolic field to be symmetrically distributed with respect to the $x$ and $y$ axes and to have a strength of 400 gauss at distances of 1 cm. along the $x$ and $y$ axes from the center of the beam. Also assume the field to extend a distance of 10 cm. along the beam axis. Then, with the foregoing conditions, the approximate distance of the work piece from the lower end of the field required to produce the desired irradiated area may be determined as follows. The radius of curvature, $\rho$, of an electron at the beam periphery and entering the field at a position on the $x$ axis is:

$$\rho = \frac{E}{300\,H} = \frac{10 \times 10^6}{300 \times 400} = 83 \text{ cm.}$$

The $y$ axial displacement of the electron upon passing through the field is:

$$d = \frac{l^2}{2\rho} = \frac{10^2}{2 \times 83} = 0.60 \text{ cm.}$$

Also, $$\sin \theta = \frac{l}{\rho} = \frac{10}{83} = 0.120$$

from which, $\theta$, is determined to be 6.9°. Therefore, $\tan \theta = \tan 6.9° = 0.121$. Hence, $$z = \frac{r-d}{\tan \theta} = \frac{1.0 - 0.6}{0.121} = 3.3 \text{ cm.}$$

In other words, the cross-over plane, P, is displaced 3.3 cm. from the lower end of the field. The distance $s$ of the work piece from the cross-over plane is computed as follows:

$$s = \frac{y'}{2 \tan \theta} = \frac{4.0}{2 \times .121} = 16.53 \text{ cm.}$$

Thus, the relative distance between the work piece and field is adjusted, as by translating the field generating means along the beam axis, to a value of $s+z$, or 3.3

$+16.53 = 19.83$ cm. to produce the 4.0 cm. width of the irradiated area.

The length of the irradiated area corresponding to the foregoing values is given approximately by:

$$x' = 2[r+d+(s+z) \tan \theta]$$
$$= 2[1+.60+19.83 \times .121] = 7.99 \text{ cm.}$$

Thus by appropriate adjustment of the distance, $s+z$, between the field and work piece to approximately 19.83 cm., an irradiated area of 4 x 7.99 square centimeters is produced.

Considering now the means by which an electron beam may be quadrilaterially enlarged in accordance with the method set forth hereinbefore, it is to be noted that such means consists generally of a magnet means for generating a hyperbolic magnetic field transverse to the axis of a charged particle beam, and adjusting means for controlling the distance between the magnet means and the beam cross-over or focal plane thereof to values less than the distance between the magnet means and a work piece impinged by the beam. Several alternatives are possible in the adjusting means, the position of the cross-over plane relative to the positions of the magnet means and work piece being adjustable by variation of the strength of the field, variation of the distance between the magnet means and work piece along the beam axis, or both.

The specific structural embodiments respectively illustrated in FIGS. 2 to 4, and FIG. 5, are designed to the foregoing ends; however, it will be appreciated that other alternatives are possible and therefore the specific structural details of the illustrated embodiments set forth hereinafter are to be considered as being purely illustrative and in no way limiting upon the invention.

Referring now to FIGS. 2 to 4, the quadrilateral beam enlarger constructed in accordance with the present invention is seen to include an elongated rectangular vacuum housing 21 provided with a circular flange 22 at its upper end to facilitate vacuum-tight attachment to the beam exit end of a linear electron accelerator, or other source of high energy charged particles. The housing is additionally provided with a cylindrical flange 23 at its lower end to facilitate vacuum-tight attachment of a radiation window (not shown) or equivalent closure means transparent to a charged particle beam. A charged particle beam emanating from an accelerator or the like may thus be readily directed coaxially through the housing 21 in transit to a work piece to be irradiated.

In order to generate the desired hyperbolic magnetic field for the quadrilateral enlargement of the beam passing through the vacuum housing, four axially elongated magnetic pole pieces 24, 26, 27, 28 are mounted for translation longitudinally of the housing exteriorly adjacent to the four corner edges thereof, respectively. More specifically, one pair of the pole pieces 24, 26 is disposed in juxtaposition to the outer surface of one side wall of the housing with each pole piece extending longitudinally thereof for a substantial portion of the extent of the wall.

Pole piece 24 extends inward from one corner edge of the side wall and terminates short of the longitudinal center line of the side wall. Similarly, pole piece 26 extends inward from the opposite corner edge of the side wall to a position short of the longitudinal center line. Thus the pole pieces 24, 26 are symmetrically disposed relative to the longitudinal center line of the side wall and have their transverse faces in spaced opposition.

The other pair of pole pieces, 27, 28 are disposed in juxtaposition to the outer surface of the opposite side wall of the housing in like relationship as the pole pieces 24, 26. Pole pieces 27, 28 thus have their transverse faces in spaced opposition. Moreover, pole pieces 24 and 27 are disposed in transversely spaced opposition at the opposite side walls of the housing as are pole pieces 26 and 28.

A source of magnetomotive force, in the present case an electromagnet assembly 29, is mechanically secured and magnetically coupled between the pole pieces 24, 26. Similarly, an electromagnet assembly 29', or equivalent source of magnetomotive force, is mechanically secured and magnetically coupled between the pole pieces 27, 28 in polar opposition to the magnet assembly 29.

The magnetic flux emanating from magnet assembly 29 flows between pole pieces 24, 26 through the interior of the housing while the flux from magnet assembly 29' flows similarly between pole pieces 27, 28, but in the opposite direction. Thus pole pieces 24, 27 are of opposite polarities, as are pole pieces 26, 28, whereby flux flows respectively therebetween. It will be appreciated that the electromagnets and pole pieces disposed and oriented in the foregoing manner produce a hyperbolic magnetic field within the housing which is symmetric with respect to two right angularly related transverse axes.

Considering now more specifically the electromagnet assemblies 29, 29' as regards their preferred structures, it will be noted that each assembly includes a longitudinally elongated yoke 31 of permeable material and of substantially H-shaped cross section, the yoke including parallel spaced leg portions 32, 33 interconnected by a right angularly related web portion 34. Corresponding end faces of the leg portions 32, 33 are rigidly attached to the side walls of pole pieces 24, 26 in intimate contact therewith. Corresponding end faces of leg portions 32', 33' of yoke 31' are likewise rigidly and intimately attached to the side walls of pole pieces 27, 28.

Each assembly further includes a substantially rectangular winding 36 wound about the web portion 34 of the yoke, the winding being centered with respect to an axis extending transversely through the center of the web between the leg portions 32, 33. Thus upon energization of the respective windings with direct current, magnetic flux is generated which passes through the web portions of the yoke to the leg portions thereof and through the pole pieces into the interior of the housing to establish the hyperbolic field therein. The strength of the field may readily be varied to vary, in turn, the axial position of the beam cross-over plane by adjusting the magnitude of the current applied to the windings.

The pole pieces 24, 27 are secured together by means of a longitudinally elongated adjusting bracket 37 disposed outwardlly adjacent to one transverse wall of the housing. Similarly, pole pieces 26, 28 are secured together by means of an adjusting bracket 38 disposed outwardly adjacent to the other transverse wall of the housing. Thus the pole pieces, electromagnet assemblies, and adjusting brackets form an integral unit which encompasses the longitudinal and transverse side walls of the housing and is axially slidable relative thereto.

This unit may be translated along the housing to positions of varied displacement relative to a work piece disposed beneath the housing so as to vary the position of the beam cross-over plane relative to the work piece. The unit may be locked in any desired position along the housing as by means of set screws 39, or the like, threadably secured to the brackets 37, 38 and extending therethrough into engagement with the transverse side walls of the housing.

In order that the windings 36, 36' may be energized readily with electrical current, a terminal strip 41 is preferably secured to one bracket 37 and the ends of the windings are electrically connected to the respective terminal lugs thereof. Any suitable D.C. power supply (not shown) may be connected to the terminal lugs of the strip 41 in an appropriate manner to supply current which will flow in the proper directions through the windings to induce the described fields of opposite polarities between spatially opposed sets of the pole pieces.

Inasmuch as the windings may be heated to a substantial degree upon the sustained flow of current therethrough, cooling coils 42 or the like are preferably embedded in the yokes 31 and adapted for connection to a suitable source of coolant (not shown).

It will be appreciated that the sources of magnetomotive force employed to generate the hyperbolic magnetic field in the beam enlarging apparatus of the present invention may be in the form of permanent magnets instead of the electromagnets of the embodiment of FIGS. 2 to 4. More particularly, the apparatus may be modified as indicated in FIG. 5 to facilitate the use of a pair of permanent horseshoe magnets 43, 44 to generate the magnetic enlarging field.

It is to be noted that, except for the employment of the permanent magnets, the apparatus of FIG. 5 is in basic respects similar to that of FIGS. 2 to 4, and the components which are identically common to both apparatus are indicated by like reference numerals. The embodiment of FIG. 5, like that of FIGS. 2 to 4, includes the vacuum housing 21 with flanges 22 and 23 and adjusting brackets 37, 38 carrying the set screws 39 for releasably securing the pole piece and magnet assembly at any axial position of translation along the housing. The pole pieces employed in the instant embodiment, however, are of somewhat modified form compared to the pole pieces 24, 26, 27, 28 so as to accommodate the permanent horseshoe magnets 43, 44.

In place of the pole pieces 24, 26, 27, 28 of rectangular cross section, the embodiment of FIG. 5 includes pole pieces 46, 47, 48, 49 of substantially L-shaped cross section, these pole pieces being arranged in a fashion similar to the arrangement of the pole pieces 24, 26, 27, 28 so as to be supported exteriorly adjacent to the opposite longitudinal sides of the housing inwardly of the corner edges thereof.

The pole pieces 46, 48 are secured to the adjusting bracket 37 while pole pieces 47, 49 are secured to adjusting bracket 38. The projecting portions of pole pieces 46, 47 and of pole pieces 48, 49 are then respectively secured to the pole tips of the magnets 43, 44 by means subsequently described, the magnets being oriented in polar opposition to each other. In addition, for purposes of providing rigidity of structure, the pole pieces 46, 47 and 48, 49 are respectively secured rigidly together by means of mounting brackets 51 and 52.

Inasmuch as it is desirable that the strength of the magnetic field, generated within the housing by the pole pieces and permanent magnets, be adjustable as it is in the electromagnet embodiment of the apparatus illustrated in FIGS. 2–4, provision is made in the attachment of the magnets to the pole pieces for the establishment of adjustable air grips in the magnetic circuits. More specifically, a jack bolt 53 is threadably engaged with the projecting portion of each pole piece, and a jack screw 54 is inserted through each corresponding pole tip of the magnets and secured to the jack bolt. The magnets are thus translatable with respect to the pole pieces upon rotation of the jack screws so as to establish air gaps of adjustable length between the magnet pole tips and the pole pieces. Variation of the lengths of the air gaps varies the strength of the magnetic field generated within the housing.

In the operation of the beam enlarging apparatus hereinbefore described, the housing 21 is first coupled in axial alignment with the beam exit end of a high energy particle accelerator or equivalent charged particle source. A work piece to be irradiated is disposed beneath the housing in spaced relation thereto.

The individual particles of the beam emanating from the charged particle source are deflected while passing through the hyperbolic magnetic field established within the housing in accordance with the considerations described hereinbefore relative to the method of the invention. The strength of the field is adjusted by adjusting the magnitude of current applied to the windings of the electromagnets of the embodiment of FIGS. 2 to 4, or by adjusting the lengths of the air gaps in the magnetic circuits of the embodiment of FIG. 5, so as to position the beam cross-over plane in spaced relation to the work piece. Alternatively, the magnet and pole piece unit may be translated axially of the housing and locked by means of the set screws 39 in a position which is productive of a beam cross-over plane located in spaced relation to the work piece. Of course, both the field strength and position of the magnet and pole piece unit may be adjusted cooperatively to accomplish the foregoing.

With the cross-over plane positioned as described, the beam is quadrilaterally enlarged in its impingement of the work piece whereby the beam is distributed over a relatively large dosage area. Moreover, specific dimensions of the dosage area may be established in the manner described relative to the method by appropriate adjustment of the foregoing parameters to adjust, in turn, the spacing between the cross-over plane and work piece to a suitable distance productive of the specific area dimensions desired.

What is claimed is:

1. In combination with a device for producing a charged particle beam of given transverse dimensions apparatus for the adjustable quadrilateral enlargement of said charged particle beam at a discrete plane of utilization comprising a vacuum housing for axial transversal by a charged particle beam, magnet means disposed adjacent said housing for generating a hyperbolic magnetic field transversely of said housing with the field being symmetrical with respect to two mutually perpendicular transverse axes, said magnet means being adapted to expand said beam along one of said transverse axes and to focus said beam along the other of said axes, means mounting said magnet means for translation axially of said housing, and means for disposing said apparatus a distance from said plane of utilization such that the plane of focus of said beam resides between said plane of utilization and said housing.

2. Apparatus according to claim 1, further defined by said magnet means being adjustable in the strength of said magnetic field.

3. Apparatus for adjustably enlarging a charged particle beam for application at a discrete plane of utilization comprising a vacuum housing having a rectangular cross-section and adapted for axially aligned attachment to a source of charged particles, a first pair of longitudinally elongated pole pieces respectively disposed exteriorly adjacent one side wall of said housing at the opposite corner edges thereof with their transverse faces in spaced opposition, a second pair of longitudinally elongated pole pieces respectively disposed exteriorly adjacent the other side wall of said housing at the opposite corner edges thereof with their transverse faces in spaced opposition, a pair of adjusting brackets respectively disposed exteriorly adjacent the opposite transverse walls of said housing and secured between the adjacent pole pieces of said first and second pairs thereof, a magnet secured between the pole pieces of said first pair thereof, a second magnet secured between the pole pieces of said second pair thereof and oriented in polar opposition to said first magnet, said magnets and pole pieces cooperating to focus the beam passing therethrough along one transverse axis thereof and defocus it along the transverse axis perpendicular thereto, set screw means carried by said adjusting brackets for releasably engaging the adjacent transverse walls of said housing, and means for disposing said apparatus a distance from said plane of utilization such that the plane of focus of said beam resides between said plane of utilization and said housing.

4. Apparatus according to claim 3, further defined by said magnets being electromagnets each including a yoke and winding for inducing magnetic flux in the yoke upon energization with electric current, said yokes being respectively secured between the pole pieces of the first pair thereof and between the pole pieces of the second pair thereof.

5. Apparatus according to claim 3, further defined by said magnets being permanent horseshoe magnets, and fastening means securing the pole tips of said magnets to said pole pieces for adjustable translation therebetween.

References Cited in the file of this patent

UNITED STATES PATENTS

| | | |
|---|---|---|
| 2,896,103 | Farrell | July 21, 1959 |
| 2,941,077 | Marker | June 14, 1960 |

FOREIGN PATENTS

| | | |
|---|---|---|
| 834,540 | Great Britain | May 11, 1960 |